Oct. 13, 1959 H. F. MEYER 2,908,186
CAM ASSEMBLY AND CAM FOLLOWER
Filed Jan. 19, 1959 2 Sheets-Sheet 1
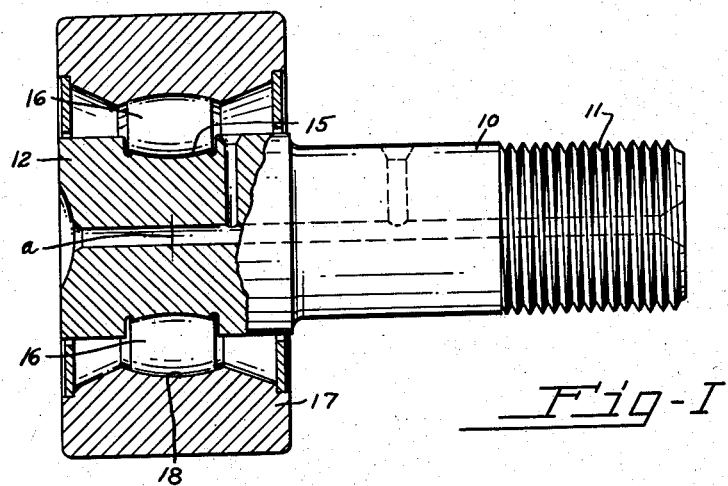
Fig-I
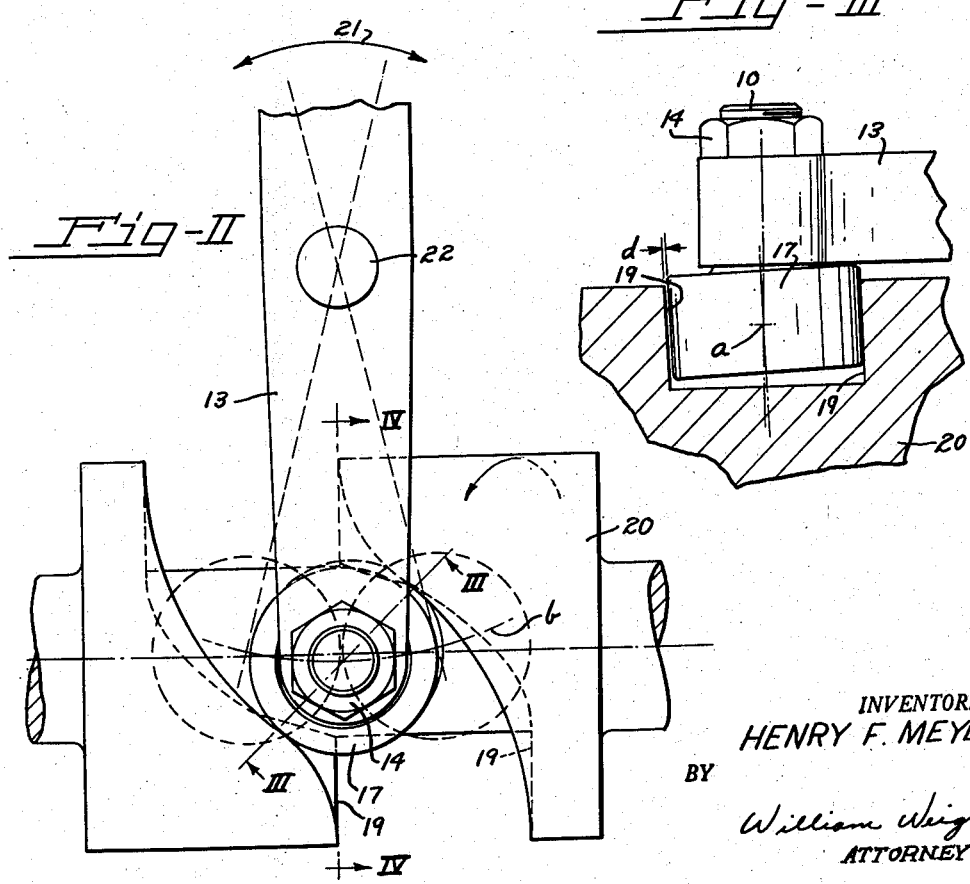
Fig-II
Fig-III
INVENTOR.
HENRY F. MEYER
BY
William Weigl
ATTORNEY

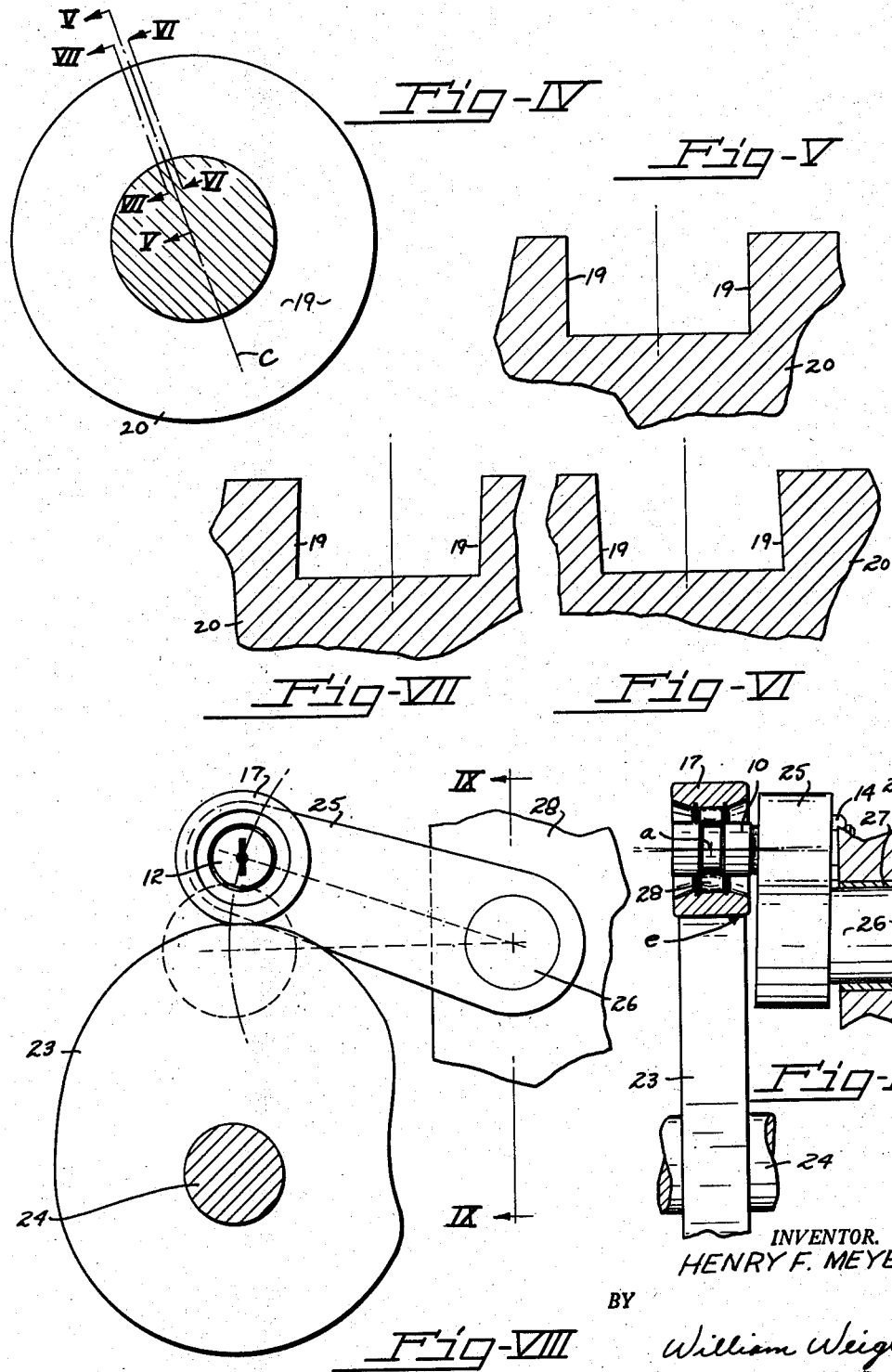

2,908,186

CAM ASSEMBLY AND CAM FOLLOWER

Henry F. Meyer, University Heights, Ohio

Application January 19, 1959, Serial No. 787,672

6 Claims. (Cl. 74—569)

This invention relates generally to improvements in cam followers of the type in which the roller is mounted in outboard or cantilever relation to the supporting member therefor, and is a continuation-in-part of U.S. application Ser. No. 587,511 filed May 28, 1956, which in turn was copending with and a continuation-in-part of U.S. applications Ser. No. 469,780 filed Nov. 18, 1954 and Ser. No. 315,078 filed Oct. 16, 1952.

All of the known outboard-supported cam followers prior to the present invention have been of the conventional needle-bearing or ball-bearing type, having an outer cylindrical cam following portion which is constructed and mounted to remain parallel with the stud or shaft axis on which it is supported, except for certain followers constructed with the cam following portion slightly crowned. The purpose of the crown in the latter type of follower is to compensate for misalignment of the follower stud relative to the axis of the cam, due either to deflection of the stud from loads exerted thereon or angularity of the cam's surface relative to the axis of the follower. While crowned rollers are useful in certain applications, their usefulness is limited to those cases where the loads between the cam and follower are slight, because of the point contact between the cooperating surfaces. When the loads are high, such point contact is known to cause rapid breakdown and deterioration of cams.

Accordingly, since crowned followers are recognized to be ineffective in high-load applications, the aforementioned conventional needle or ball-bearing cam followers with cylindrical outer surfaces have been used, with the intent and purpose that line contact be maintained between the cams and their cam followers, thus eliminating the cam breakdown trouble inherent in the use of crowned followers. However, while this line contact might be maintained on some portions of the cams, whenever severe loads exist which cause deflection in the outboard support for the follower, or whenever there is slight misalignment between the cam and roller surfaces due either to wear or to manufacturing inaccuracies, the follower would tend to "heel" and cause what is commonly termed "edge-loading." This "edge-loading" would result in the same trouble caused by crowned cam followers, i.e., a rapid deterioration of the cams due to the concentration of severe loads over a small area of the cam's surface. Once a cam surface would start to erode, a conventional follower would tend to contact only that portion of the cam against which the edge-loading would occur, thus progressively creating less and less of a contact area. The rapidity of this deterioration would be limited primarily by the material of the cam and the forces involved, and to a certain extent, the amount of misalignment of the contacting surfaces.

The primary object of this invention is to provide a cam-follower of the outboard type, the use of which prolongs the life of a cam with which it cooperates.

More specifically, the object of the invention is to provide a self-aligning cam follower of the outboard type which maintains line contact with the cam surface with which it cooperates at all times.

One object of the invention resides in the provision of a roller supporting structure which is formed to facilitate line contact of the face of the roller with a cam having one or more oblique areas in the working surface thereof.

Another object of the invention is to reduce wear between a cam and a cantilever supported cam follower by compensating for any deflection of the supporting member for the follower roller during normal operation of the cam while maintaining line contact between the roller and the cam surface.

Other objects and advantages will be apparent from the following description in which reference is made to the accompanying drawings.

In the present invention, self-aligning bearing means is provided between a cam follower roller and its outboard support to enable a limited universal movement of the roller to compensate for deflection in the outboard support or misalignment between the cam surface and roller.

In the drawings:

Fig. I is an enlarged longitudinal sectional view of one type of self-aligning, outboard-supported cam follower constructed according to the invention.

Fig. II is a view of the cam follower of Fig. I cooperating with a drum or barrel cam.

Fig. III is a sectional fragmentary view taken along line III—III of Fig. II.

Fig. IV is a view of one of the side walls of the drum cam of Fig. II and is taken generally along line IV—IV of Fig. II.

Figs. V, VI and VII are cross-sectional views taken along lines V—V, VI—VI and VII—VII respectively of Fig. IV.

Fig. VIII is an elevational view of my improved follower cooperating with a profile cam.

Fig. IX is a side view taken along line IX—IX of Fig. VIII, illustrating the preferred form of self-aligning bearings means in such environment.

Referring now to Fig. I, the preferred form of my improved cam follower includes a stud 10 which has a threaded end portion 11 at one end and an enlarged head 12 at the other end thereof. The stud 10 is adapted to be mounted in a lever such as 13 shown in Fig. II. A nut 14 is threaded on the end portion 11 to fasten the stud 10 securely to the lever 13.

The head 12 of the stud 10 is constructed to provide an inner race 15 about which is located a plurality of self-aligning bearings 16. A follower roller 17 is supported on the bearings 16 by means of an outer race 18 which is formed internally of the roller 17. The bearings and the races are manufactured to closed tolerances as is customary in conventional self-aligning bearings which support shafts in frames. The bearings 16 are preferably barrel rollers, and the inner and outer races are constructed to enable universal self-aligning movement of the roller 17 about a point "a" on the axis of the stud 10. The permissible self-aligning movement is fully universal about the roller 17, but is limited in an axial direction relative to the stud 10 by engagement of the roller 17 with the stud in the form of cam follower illustrated in Fig. I.

Referring now to Fig. II, the roller 17 is shown mounted on the lever 13 for engagement with side walls 19 of a rotary drum or barrel cam 20. The cam 20 may be designed to provide an oscillating motion of the lever 13 in the direction of arrow 21 about a pivot 22. The pivot 22 is located a fixed distance from the cam 20. Because of the manner in which the lever 13 is mounted, the stud 10 and roller 17 will move through an arcuate path b. During such movement, the roller will move laterally with respect to the axis of the drum cam 20 between the two end positions illustrated in dotted lines in Fig. II. As such roller moves along the path $b$, its relationship to the side walls 19 will vary with respect to a radial line $c$ shown in Fig. IV, causing the roller to tilt relative to the stud 10 to maintain the desired line contact. When the roller is in the position illustrated in full lines in Fig. II, it will be to one side of the radial line $c$ and therefore the roller 17 and side walls 19 will appear as shown in Fig. III. In this latter figure it will be noted that the axis of the roller 17 has shifted with respect to the axis of the stud 10 in a self-aligning movement about the point $a$ to maintain the outer surface of the roller 17 in full line contact with a side wall 19 of the cam groove. Were such self-aligning movement not possible, point contact only would occur between the roller 17 and the side wall 19 at their upper portions in Fig. III, thus causing grooving of the roller and gutting of the side wall.

About .005 inch has been found to be a satisfactory clearance $d$ between the roller 17 and the width of the groove for high precision use of a cam of the type shown. When conventional followers are used, the groove must be machined with almost twice this clearance, or otherwise the side walls must be hand scraped in the areas which correspond generally to the end limits and center position of the roller 17 as illustrated in Fig. II. It is in these positions that my self-aligning roller 17 takes the greatest degree of tilt relative to the stud.

Referring now to Figs. IV through VII, it will be noted that a drum cam is manufactured with a groove having perpendicular side walls on any radial line through the axis of the drum, but which side walls are inclined in opposite directions on either side of the radial line because of the manner in which the cam groove must be generated during its manufacture. Further, because of the arcuate path $b$ through which the roller 17 travels, and because of the reversal of inclination of the side walls 19, it is obvious that my universally mounted roller 17 will maintain line contact with the side walls of the cam groove for all positions of the roller and at all points in the groove. I prefer to divide the arcuate movement evenly in a lateral direction of the cam axis for minimum self-aligning movement of the roller.

Referring now to Figs. VIII and IX, my self-aligning cam follower is also adapted for use in connection with a profile cam 23. Such a cam is manufactured with a cam surface intended to be parallel with the axis of a shaft 24 at all points about the cam surface. The follower roller 17 is mounted on one end of a lever 25 which is supported at its other end on a shaft 26 journaled in a sleeve bearing 27 in a frame member 28. As is conventional in any apparatus of this sort, any of several known means may be utilized to urge the roller 17 in opposition to its work stroke to maintain the roller in contact with the cam surface at all times. Since a shaft such as shaft 26 must necessarily be provided with manufacturing tolerances which enable a free running fit, it is obvious that a conventional follower roller would cause severe edge loading at a point $e$ due to the free fit of the shaft 26 in the bearing 27, and any deflection in either the shaft 26, lever 25 or stud 10. Such edge load is eliminated when my self-aligning cam follower is used, without any loss in precision of operation of the shaft 26. Full line contact of the roller is provided across the cam, and the load is evenly distributed regardless of any deflection in the component parts or their free running fits. The roller 17 of Figs. VIII and IX is adapted for movement between its full and dotted line positions which correspond to the high and low points of the cam 23. During movement between its two end positions, the load between the cam 23 and roller 17 will constantly vary and contribute greatly to deflection in the outboard support for the roller 17 as illustrated in Fig. IX. To maintain full line contact between the roller 17 and the surface of the cam 23 during variations in the load and for all positions of the roller, the roller 17 pivots in a universal self-aligning movement about the point $a$ in the axis of the stud 10 to compensate for normal deflection. I prefer that a self-aligning cam follower which is adapted to compensate for deflection only be one in which but a very small movement of the roller be permitted in an axial direction with respect to the stud. In some instances less than 1° of movement to either side of a perpendicular plane through point $a$ and the axis of the stud 10 is sufficient. However, depending on the extent of the load between the cam and follower and the type of support for the follower, several degrees of movement may be necessary. I can limit the extent of such movement by providing barrel rollers 28 with but a few thousandths of an inch crown and further provide that the inner and outer races with which the barrel rollers 28 cooperate be cylindrical. The very slight crown of the barrel rollers 28 will permit only a very limited degree of rocking of the follower roller 17 in an axial direction.

It will be seen from the foregoing that various modifications in the details of construction may be made without departing from the spirit and scope of the invention.

Having described my invention, I claim:

1. A drum cam assembly including a drum cam having a continuous groove defined by a bottom wall and opposed side walls, said groove being generated to provide each side wall with a face which is perpendicular with respect to the axis of the cam on a radial line extending from the cam axis and which is inclined with respect to any line on the face of the side wall other than a radial line, a cam follower stud projecting into the groove, self-aligning bearing means mounted on the stud, a cam follower roller carried rotatably on the stud by the self-aligning bearing means for guiding engagement with the side walls, said roller being spaced from the bottom wall and further being universally movable to a limited extent about a point in the axis of the stud to maintain line contact between the roller and the side walls of the cam groove, and means mounting the stud with its axis to one side of the radial line extending from the axis of the cam.

2. A drum cam assembly according to claim 1 wherein the mounting means for the stud is movable laterally relative to the axis of the cam.

3. A drum cam assembly according to claim 2 wherein said mounting means comprises a lever mounted on a fixed pivot spaced laterally from the cam, and wherein an arcuate path is struck by the roller as it follows the cam groove.

4. A cam follower for use in outboard relation with the support therefor comprising a stud, means for supporting one end of the stud, said stud having a bearing race in the opposed end thereof, a cam follower roller having a corresponding race facing the race in the stud, said roller having an outer periphery adapted to engage a cam surface with line contact, and self-aligning antifriction bearing means in said races mounting the follower roller on the stud, said bearing means and races being constructed to enable limited universal movement of the roller about a point in the axis of the stud.

5. An anti-friction cam follower comprising an outer race including a roller adapted to have its outer periphery engage a cam surface with a load which varies as the cam operates, an inner race, an outboard support for said inner race, and a plurality of rollable bearings supporting the outer race on the inner race, said bearings and the surfaces of said inner and outer races with which the bearings cooperate being constructed to enable a limited universal movement of said outer race about a point in the axis of the inner race to maintain line contact between the roller and the cam surface.

6. An anti-friction cam follower according to claim 5 wherein said bearings comprise barrel rollers and wherein the surfaces of said inner and outer races with which the rollers cooperate are cylindrical.

References Cited in the file of this patent

UNITED STATES PATENTS

| | | |
|---|---|---|
| 157,029 | Siviter et al. | Nov. 17, 1874 |
| 178,441 | Houghtaling et al. | June 6, 1876 |
| 1,256,153 | Moore et al. | Feb. 12, 1918 |
| 1,658,318 | Wineman | Feb. 7, 1928 |
| 1,766,440 | Leon | June 24, 1930 |
| 1,869,890 | Gibbons | Aug. 2, 1932 |
| 2,082,390 | Gibbons | June 1, 1937 |
| 2,099,660 | Robinson | Nov. 16, 1937 |
| 2,183,061 | Bochman | Dec. 12, 1939 |
| 2,481,812 | Beatrice | Sept. 13, 1949 |
| 2,522,607 | Dedieu | Sept. 19, 1950 |
| 2,573,506 | Stokes | Oct. 30, 1951 |
| 2,664,866 | Fulke | Jan. 5, 1954 |

FOREIGN PATENTS

| | | |
|---|---|---|
| 51,390 | Sweden | Feb. 17, 1911 |
| 62,286 | Sweden | Sept. 24, 1923 |
| 438,101 | Germany | Dec. 2, 1926 |
| 1,053,884 | France | Oct. 7, 1953 |